US011930132B2

United States Patent
Baumann et al.

(10) Patent No.: US 11,930,132 B2
(45) Date of Patent: Mar. 12, 2024

(54) METHOD, SYSTEM, AND COMPUTER PROGRAM PRODUCT TO ACCURATELY ROUTE A CALL REQUEST

(71) Applicant: Baptist Health South Florida, Inc., Coral Gables, FL (US)

(72) Inventors: Matthew Jared Baumann, Palmetto Bay, FL (US); Richard Lee Borough, III, Miami, FL (US)

(73) Assignee: Baptist Health South Florida, Inc., Coral Gables, FL (US)

( * ) Notice: Subject to any disclaimer, the term of this patent is extended or adjusted under 35 U.S.C. 154(b) by 0 days.

(21) Appl. No.: 18/147,301

(22) Filed: Dec. 28, 2022

(65) Prior Publication Data
US 2023/0216962 A1  Jul. 6, 2023

Related U.S. Application Data

(63) Continuation of application No. 16/845,586, filed on Apr. 10, 2020, now Pat. No. 11,563,853.
(Continued)

(51) Int. Cl.
 *H04M 3/523* (2006.01)
 *H04M 3/42* (2006.01)
 *H04M 3/51* (2006.01)

(52) U.S. Cl.
 CPC ..... *H04M 3/5237* (2013.01); *H04M 3/42068* (2013.01); *H04M 3/5175* (2013.01);
(Continued)

(58) Field of Classification Search
None
See application file for complete search history.

(56) References Cited

U.S. PATENT DOCUMENTS

| 5,903,641 | A  | * | 5/1999 | Tonisson | H04M 3/5233 |
| | | | | | 379/266.01 |
| 10,491,748 | B1 | * | 11/2019 | Wu | H04M 3/5233 |

(Continued)

OTHER PUBLICATIONS

Everest Group Research, "Contact Center Outsourcing (CCO) Market for the Healthcare Industry—Service Provider Landscape with PEAK Matrix(tm) Assessment 2017, Contact Center Outsourcing (CCO) Market Report: Jan. 2017—Preview Deck," Jan. 2017, 11 pp., Everest Global, Inc.

(Continued)

*Primary Examiner* — Antim G Shah
(74) *Attorney, Agent, or Firm* — The Webb Law Firm

(57) ABSTRACT

A system, method, and computer program product to accurately route a call is disclosed, by providing a resource interface having one or more interface elements mapping a resource to a call based on current calls and predicted calls, determining a dynamic handling profile from a plurality of dynamic handling profiles that include call information which maps to a resource to provide a ruleset for handling one or more types of call requests, identifying a routing rule comprising one or more routing rules of the ruleset based on caller information, receiving an activation of a resource interface element of the resource interface to initiate a call routing request to forward an assigned call to the resource, and controlling the call routing request according to the routing rule of the dynamic handling profile to perform a call function associated with the assigned call.

17 Claims, 12 Drawing Sheets

Related U.S. Application Data

(60) Provisional application No. 62/832,582, filed on Apr. 11, 2019.

(52) U.S. Cl.
CPC ....... *H04M 3/5191* (2013.01); *H04M 3/5232* (2013.01); *H04M 2203/158* (2013.01); *H04M 2203/256* (2013.01); *H04M 2203/401* (2013.01)

(56) References Cited

U.S. PATENT DOCUMENTS

| | | | |
|---|---|---|---|
| 11,563,853 B2* | 1/2023 | Baumann | H04M 3/5237 |
| 2017/0111503 A1* | 4/2017 | McGann | H04M 3/5235 |

OTHER PUBLICATIONS

Evolve IP, "Omnichannel Among Top 11 Healthcare Call Center Trends," Jun. 29, 2018, Evolve IP, www.evolveip.net/blog/omnichannel-among-top-11-healthcare-call-center-trends.

* cited by examiner

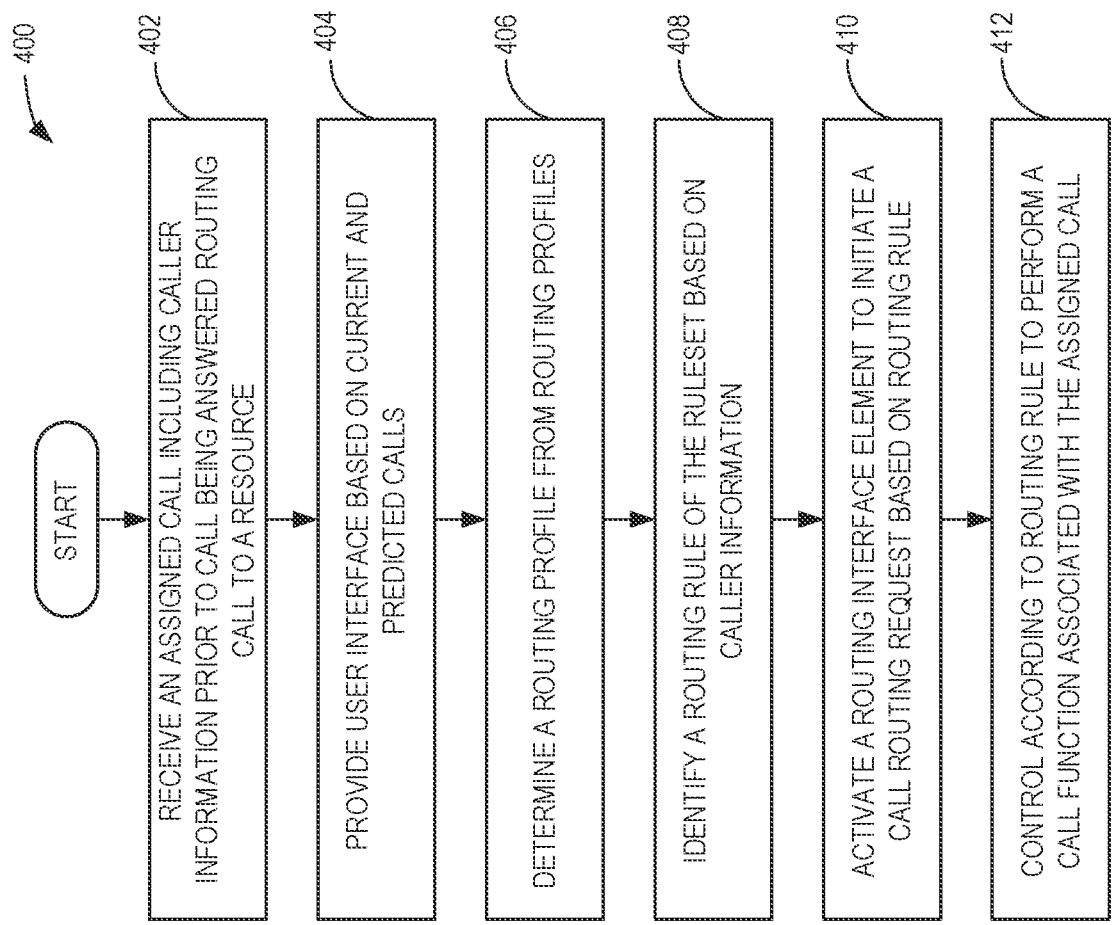

PHYSICIAN INFORMATION

PHYSICIAN NAME: NICHOLAUS LAMBROU
LA-M-BR-OU

PHYSICIAN OFFICE LOCATION: 3N429

MD CONTACT: PHONE: 786-527-8084
CELL: 305-773-7851
EMAIL: NICHOLASL@BAPTISTHEALTH.NET

SEEING PATIENTS: YES
ACCEPTING NEW PATIENTS: YES
ACCEPTANCE NOTES: N/A

CHANGES MADE

PHYSICIAN CALL ROUTING

MD TO MD CALL PREFERENCE

PEGGE GOMEZ
PHONE: 786-527-8953
ASCOM: 786-594-7918
EMAIL: PEGGEG@BAPTISTHEALTH.NET

NICHOLAUS LAMBROU, MD
PHONE: 786-527-8084
ASCOM: 305-773-7851
EMAIL: NICHOLASL@BAPTISTHEALTH.NET

MD TO MD REFERRALS

MA PRIMARY
PEGGE GOMEZ
PHONE: 786-527-8953
ASCOM: 786-594-7918
EMAIL: PEGGEG@BAPTISTHEALTH.NET

SURGICAL COORDINATOR
JANINA C. SANTIAGO
PHONE: 786-527-7805
ASCOM:
EMAIL: JANINAS@BAPTISTHEALTH.NET

| | ✓ | x | ✓ | fx | STEPS REQUIRED TO COME TO RESOLUTION. THESE ARE | |
|---|---|---|---|---|---|---|
| | B | C | | D | E | F |
| | STATUS | RECEIVED ON DATE | | ISSUE | ASSOCIATED PATIENT | REPORTED BY |
| | RESOLVED | 4/11/2017, 6:10A | | ISSUE AS COMMUNICATED BY CALLER OR STAFF MEMBER IS DESCRIBED HERE WITH AS MUCH DETAIL AS POSSIBLE | JOHN DOE, DOB 1/2/34 | PATIENT |
| | RESOLVED | 4/11/2017, 6:10A | | ISSUE AS COMMUNICATED BY CALLER OR STAFF MEMBER IS DESCRIBED HERE WITH AS MUCH DETAIL AS POSSIBLE | JOHN DOE, DOB 1/2/35 | PATIENT |
| | RESOLVED | 4/11/2017, 6:10A | | ISSUE AS COMMUNICATED BY CALLER OR STAFF MEMBER IS DESCRIBED HERE WITH AS MUCH DETAIL AS POSSIBLE | JOHN DOE, DOB 1/2/35 | PATIENT |
| | RESOLVED | 4/11/2017, 6:10A | | ISSUE AS COMMUNICATED BY CALLER OR STAFF MEMBER IS DESCRIBED HERE WITH AS MUCH DETAIL AS POSSIBLE | JOHN DOE, DOB 1/2/37 | PATIENT |
| | | | | | | |
| | RESOLVED | 4/11/2017, 6:10A | | ISSUE AS COMMUNICATED BY CALLER OR STAFF MEMBER IS DESCRIBED HERE WITH AS MUCH DETAIL AS POSSIBLE | JOHN DOE, DOB 1/2/38 | PATIENT |

FIG. 5B

METHOD, SYSTEM, AND COMPUTER PROGRAM PRODUCT TO ACCURATELY ROUTE A CALL REQUEST

CROSS-REFERENCE TO RELATED APPLICATION

This application is a continuation of U.S. patent application Ser. No. 16/845,586, filed on Apr. 10, 2020, which claims the benefit of United States Provisional Patent Application No. 62/832,582, filed Apr. 11, 2019, the disclosures of which are hereby incorporated in their entirety by reference.

BACKGROUND OF THE INVENTION

1. Field of the Invention

This disclosed subject matter relates generally to methods, systems, and computer program products for automatic call mapping and controlling a call during handling and mapping to a resource. In particular, the present invention relates to mapping an entirety of a call landscape, caller types, recipient types, and call results, to learn, and generate knowledge about an organizations making calls, and who is receiving calls, in a mapping profile integration (MPI) protocol, system, and method for allowing control of a call center and providing a dynamic feedback loop to automatically improve telephone mapping functions to be performed to efficiently handle a caller, provide a mapped resource, and accurately route a call in a complex delivery system. A resource interface provides mapping interfaces, profile planning interfaces, dynamically updated resource interfaces, and routing improvement notifications based on feedback.

2. Description of Related Art

The fastest growing area in inbound calls is post-discharge, as providers seek to minimize readmissions or additional physician visits and referrals. Outbound calls are also being increasingly used to reduce the risk of readmission, reduce costs, and increase patient and customer satisfaction. The need for an efficient and effective call mapping system is growing as the focus for call centers has shifted from internal audiences to both internal and external audiences. Rapidly increasing numbers of consumers cause the load on global healthcare call center usage to expand to coordinate the increasing communications.

In a patient-centric world, patients expect to have access to multiple methods of communication and efficiently access relevant information in real-time. Existing call centers are facing challenges and may not accurately allow a patient to obtain information that is necessary and/or may not communicate efficiently to provide information timely, as needed or expected.

SUMMARY OF THE INVENTION

Accordingly, it is an object of the presently disclosed subject matter to provide methods, systems, and computer program products for securely rendering sensitive data.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings and Appendix, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

According to some non-limiting embodiments or aspects, provided is a computer-implemented method, comprising providing a handling interface in a call mapping system having a plurality of communication connected networks, the call mapping system including: a call distributor for assigning a plurality of incoming calls to telephone agents; a computer telephone-mapping profiler integration (CT-MPI) system for providing mapping profile data for applications to be performed at one or more agent computers of the telephone agents; at least one agent computer of the one or more agent computers for receiving an assigned call including caller information prior to the telephone call being answered to route the call to a resource and provide a resource interface having one or more interface elements mapping a resource to a call based on current calls and predicted calls; determining, by the at least one agent computer, a dynamic handling profile from a plurality of dynamic handling profiles that include call information which maps to the resource to provide a ruleset for handling one or more types of call requests; identifying, by the at least one agent computer, a routing rule comprising one or more routing rules of the ruleset based on caller information; receiving, by the at least one agent computer, an activation of a resource interface element of the resource interface to initiate a call routing request to forward the assigned call to the resource; and controlling the call routing request according to the routing rule of the dynamic handling profile to perform a call function associated with the assigned call.

According to some non-limiting embodiments or aspects, provided is a call mapping system, having one or more processors programmed or configured to: provide a resource interface having one or more interface elements mapping a resource to a call based on current calls and predicted calls; determine a dynamic handling profile from a plurality of dynamic handling profiles that include call information which maps to a resource to provide a ruleset for handling one or more types of call requests; identify a routing rule comprising one or more routing rules of the ruleset based on caller information; receive an activation of a resource interface element of the resource interface to initiate a call routing request to forward an assigned call to the resource; and control the call routing request according to the routing rule of the dynamic handling profile to perform a call function associated with the assigned call.

According to some non-limiting embodiments or aspects, provided is a computer program product comprising at least one non-transitory computer-readable medium including one or more instructions that, when executed by at least one processor, cause at least one processor to: provide a resource interface having one or more interface elements mapping a resource to a call based on current calls and predicted calls; identify a routing rule comprising one or more routing rules of the ruleset based on caller information; receive an activation of an interface element of the resource interface to initiate a call routing request to forward an assigned call to the resource; and control the call routing request according to the routing rule of the dynamic handling profile to perform a call function associated with the assigned call.

Further non-limiting embodiments or aspects are set forth in the following numbered clauses:

Clause 1: A computer-implemented method, comprising: providing a handling interface in a call mapping system having a plurality of communication connected networks, the call mapping system including: a call distributor for assigning a plurality of incoming calls to telephone agents; a computer telephone-mapping profiler integration (CT-MPI) system for providing mapping profile data for applications to be performed at one or more agent computers of the telephone agents; and at least one agent computer of the one or more agent computers for receiving an assigned call including caller information prior to the telephone call being answered to route the call to a resource and provide a resource interface having one or more interface elements mapping a resource to a call based on current calls and predicted calls; determining, by the at least one agent computer, a dynamic handling profile from a plurality of dynamic handling profiles that include call information which maps to the resource to provide a ruleset for handling one or more types of call requests; identifying, by the at least one agent computer, a routing rule comprising one or more routing rules of the ruleset based on caller information; receiving, by the at least one agent computer, an activation of a resource interface element of the resource interface to initiate a call routing request to forward the assigned call to the resource; and controlling the call routing request according to the routing rule of the dynamic handling profile to perform a call function associated with the assigned call.

Clause 2: The method of clause 1, wherein the call mapping system provides a call mapping system for generating the ruleset for one or more resources by mapping incoming calls for each resource of the one or more resources, further comprising: generating a call map, including at least one of a call type associated with one or more incoming calls, a caller type for one or more incoming calls, a call recipient type for one or more incoming calls, or exceptions associated with one or more incoming calls; and identifying a global routing ruleset comprising one or more shared routing rules providing handling parameters for each of the one or more resources.

Clause 3: The method of clauses 1-2, further comprising automatically generating the dynamic handling profile associated with the resource by merging the call map associated with the resource using one or more rules of the ruleset.

Clause 4: The method of clauses 1-3, wherein the call mapping system provides the dynamic handling profile allowing a one-hop call request between a caller and the resource, wherein the one-hop call request may comprise the at least one agent computer, the telephone agents, a computer application, or packet based phones, and, further, wherein telephone functions performed by the telephone agents and the plurality of computers, include answering, holding, and transferring calls.

Clause 5: The method of clauses 1-4, further comprising: determining call improvement feedback from call request data associated with the one or more types of call requests that provide an opportunity to train the call mapping system; and generating one or more updated dynamic handling profiles based on the call improvement feedback.

Clause 6: The method of clauses 1-5, wherein the call mapping system provides a notifier interface element of the resource interface based on determining at least one of a new call request outlier, a call issue arises, or a feedback improvement is made.

Clause 7: The method of clauses 1-6, wherein the notifier interface element is provided to identify a profile change that needs to be made as a result of call improvement feedback.

Clause 8: The method of clauses 1-7, wherein a trained dynamic handling profile model is used to generate dynamic handling profiles including the one or more updated dynamic handling profiles based on call request data.

Clause 9: The method of clauses 1-8, wherein the call improvement feedback includes call information related to a similar organization, further comprising, providing the call information to associated change within their unique environment.

Clause 10: A call mapping system, having one or more processors programmed or configured to: provide a resource interface having one or more interface elements mapping a resource to a call based on current calls and predicted calls; determine a dynamic handling profile from a plurality of dynamic handling profiles that include call information which maps to a resource to provide a ruleset for handling one or more types of call requests; identify a routing rule comprising one or more routing rules of the ruleset based on caller information; receive an activation of a resource interface element of the resource interface to initiate a call routing request to forward an assigned call to the resource; and control the call routing request according to the routing rule of the dynamic handling profile to perform a call function associated with the assigned call.

Clause 11: The system of clause 10, wherein the call mapping system provides a call mapping system for generating the ruleset for one or more resources by mapping incoming calls for each resource of the one or more resources, and is further programmed or configured to: generate a call map, including at least one of a call type associated with one or more incoming calls, a caller type for one or more incoming calls, a call recipient type for one or more incoming calls, or exceptions associated with one or more incoming calls; and identify a global routing ruleset comprising one or more shared routing rules providing handling parameters for each of the one or more resources.

Clause 12: The system of clauses 10-11, further comprising automatically generating the dynamic handling profile associated with the resource by merging the call map associated with the resource, by using one or more rules of the ruleset.

Clause 13: The system of clauses 10-12, wherein the call mapping system provides the dynamic handling profile allowing a one-hop call request between a caller and the resource, wherein the one-hop call request may comprise at least one agent computer, telephone agents, a computer application, or packet based phones and, further, wherein telephone functions performed by the call mapping system, include answering, holding, and transferring calls.

Clause 14: The system of clauses 10-13, further programmed or configured to: determine call improvement feedback from call request data associated with the one or more types of call requests that provide an opportunity to train the call mapping system; and generate one or more updated dynamic handling profiles based on the call improvement feedback.

Clause 15: The system of clauses 10-14, wherein the call mapping system provides a notifier interface element of the resource interface based on determining at least one of a new call request outlier, a call issue arises, or a feedback improvement is made.

Clause 16: The system of clauses 10-15, wherein the notifier interface element is provided to identify a profile change to be made as a result of call improvement feedback.

Clause 17: The system of clauses 10-16, wherein a trained dynamic handling profile model is used to generate dynamic handling profiles including the one or more updated dynamic handling profiles and, further, wherein the call improvement feedback includes call information related to a similar organization that provides an associated change within a unique environment.

Clause 18: A computer program product comprising at least one non-transitory computer-readable medium including one or more instructions that, when executed by at least one processor, cause at least one processor to: provide a resource interface having one or more interface elements mapping a resource to a call based on current calls and predicted calls; identify a routing rule comprising one or more routing rules of the ruleset based on caller information; receive an activation of an interface element of the resource interface to initiate a call routing request to forward an assigned call to the resource; and control the call routing request according to the routing rule of the dynamic handling profile to perform a call function associated with the assigned call.

BRIEF DESCRIPTION OF THE DRAWINGS

Additional advantages and details of the disclosed subject matter are explained in greater detail below with reference to the exemplary embodiments that are illustrated in the accompanying figures and Appendix, in which:

FIG. 4 is a step diagram for a method for accurately routing a call request to a patient resource to non-limiting embodiments or aspects of the present invention;

FIGS. 5A-5B is a step diagram and data interface of a method for accurately routing a feedback improvement to a patient resource according to non-limiting embodiments or aspects of the present invention.

DESCRIPTION OF THE INVENTION

Figure 1A:
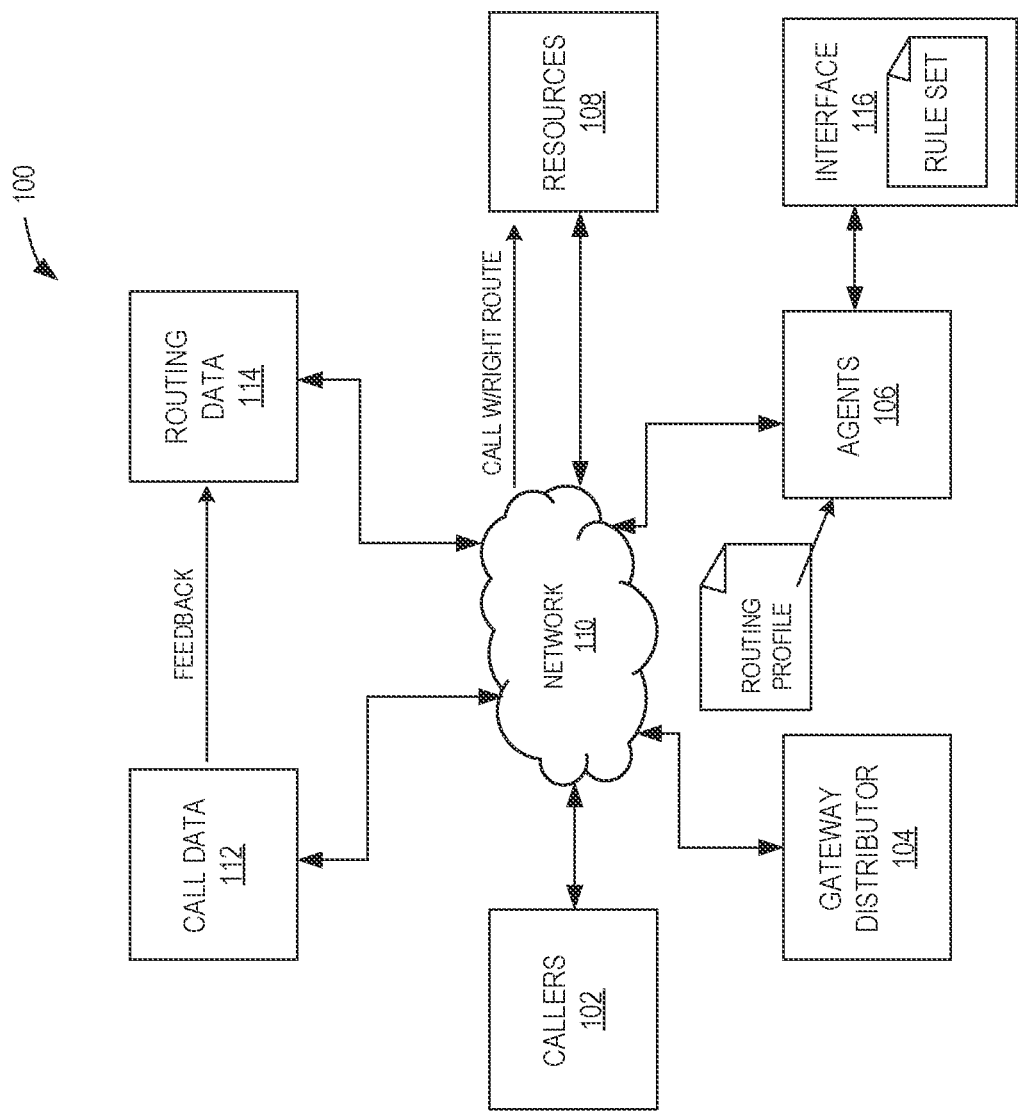
FIGS. 1A-1C are diagrams of systems, methods, protocols, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "agent" may refer to an entity that receives routing requests from patients, customers, doctors, healthcare professionals, or other entities and provide resources in exchange to a call request, in some cases through a mapping between the expected call requests and resources. As used herein, the term "computer agent" may also refer to one or more computer systems operated by or on behalf of an agent system, such as an agent server executing one or more software applications. A computer agent may include one or more processors and, in some non-limiting embodiments or aspects, may be operated by or on behalf of an agent system.

As used herein, the term "agent device" may refer to one or more devices, which may be used by an agent and/or include an electronic agent to route a call (e.g., computer agent, etc.), initiate a call routing, engage in communications, search for a dynamic handling profile, and/or process ruleset information. For example, an agent device may include one or more telephones (e.g., circuit switched, internet protocol telephones, mobile telephones, etc.) computers, peripheral devices, card readers, near-field communication (NFC) receivers, radio frequency identification (RFID) receivers, and/or other contactless transceivers or receivers, contact-based receivers, payment terminals, computers, servers, input devices, and/or the like. The agent devices may also be equipped with computer terminals, such as personal computer/video display unit's (PC/VDU's), so that agents of such stations may have access to stored data, as well as being linked to incoming callers by telephone equipment.

As used herein, the term "agent system" may refer to one or more computers and/or peripheral devices used by an agent and/or include an electronic agent to route a call. For example, an agent system may include one or more agent devices and/or other like devices that may be used to route a call. An agent system (e.g., a call handling system, etc.) may also include one or more server computers programmed or configured to process dynamic handling profile requests via an application interface, webpages, mobile applications, and/or the like, such as a central telephony switching apparatus (e.g., a call center, etc.), call distributor (e.g., an automated call distributor, etc.), a private branch exchange (PBX), a voice mail server, a gateway, etc.). Agent devices are connected to the agent system. Such agent devices may be interconnected by a local area network (LAN). One or more data or transaction servers may also be connected to the LAN that interconnects agent stations. The LAN is, in turn, connected to the CT-PRI processor, which is connected to the call switching apparatus of the call center.

As used herein, the term "portable healthcare device" may refer to a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

A "call center environment" may include an agent system to provide a unified IP contact center suite that includes multi-channel call distribution, interactive voice recognition, e-mail queue and response integration, skills-based routing, computer telephony integration, predictive dialing, multimedia/call recording, and administrative tools. A call center may connect to a telephone circuit (e.g., a line, etc.) A trunk line is a circuit connecting telephone switchboard (or other switching equipment), as distinguished from local loop circuits, which includes lines that extend from telephone exchange switching equipment to individual telephones or information origination/termination equipment.

As used herein, the term "distribution gateway" may refer to call distribution systems used by call centers to distribute incoming calls to agents. A distribution gateway allows callers to provide information relevant to their request, including data about calls, call wait times, and call length times to provide useful information to the company about their call center. For example, a selection menu may be provided to allow transmission of data that can be used by the call center to identify a dynamic handling profile having the right outing rule to direct their call. This way, the caller is quickly connected to the most suitable call center agent. The distribution gateway provides callers with options to choose from, for example, what language they wish to communicate in, what issue they wish to address, intake information related to a client's identity, what type of function they wish to perform, and/or the like. As an example, callers are given options through verbal prompts, a predetermined code, or an application. Callers respond either verbally or with their phone's keypad to make the appropriate selections. As callers make selections, they may be presented with new options to further narrow the focus of their request, or they may be sent to a selected agent.

As used herein, the terms "computing device", "mobile device", "client", and "client device" may refer to one or more client-side devices or systems (e.g., remote from a data source) used to initiate or facilitate a call request. As an example, a "client device" may refer to one or more agent devices used by an agent, one or more agent computers used by an agent system, one or more mobile devices used by a user, and/or the like. In some non-limiting embodiments or aspects, a client device may be an electronic device configured to communicate with one or more networks and initiate or facilitate communications. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a health care provider, and/or the like) that owns, utilizes, and/or operates a client device for routing calls.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "supervised learning" may refer to one or more machine learning algorithms that start with known input variables (x) and an output variable (y), and learn the mapping function from the input to the output. The goal of supervised learning is to approximate the mapping function so that predictions can be made about new input variables (x) that can be used to predict the output variables (y) for that data. The process of a supervised algorithm learning from the training dataset can be thought of as a teacher supervising the learning process. The correct answers are known. The algorithm iteratively makes predictions on the training data and is corrected by the teacher. Learning stops when the algorithm achieves an acceptable level of performance. Supervised learning problems can be further grouped into regression problems and classification problems. Supervised learning techniques can use labeled (e.g., classified) training data with normal and outlier data, but are not as reliable because of the lack of labeled outlier data. For example, multivariate probability distribution based systems are likely to score the data points with lower probabilities as outliers. A regression problem is when the output variable is a real value, such as "dollars" or "weight".

A classification problem is when the output variable is a category, such as "red" and "blue" or "compliant" and "non-compliant".

As used herein, the term "unsupervised learning" may refer to an algorithm which has input variables (x) and no corresponding output variables. The goal for unsupervised learning is to model the underlying structure or distribution in the data in order to learn more about the data. Unlike supervised learning, in unsupervised learning there are no correct answers and there is no teacher. Unsupervised learning algorithms are used to discover and present the interesting structure in the data. Unsupervised learning problems can be further grouped into clustering and association problems. A clustering problem is modeling used to discover the inherent groupings in a dataset, such as grouping customers by purchasing behavior. An association rule learning problem is where you want to discover rules that describe large portions of data, such as people that buy A also tend to buy B. Some examples of unsupervised learning algorithms are clustering and likelihood modeling.

As used herein, the term "training" may refer to a process of analyzing training data to generate a model (e.g., create a machine learning algorithm, a prediction model, a classification model, a segmentation model, etc.). For example, a training server uses machine learning techniques to analyze the training data to generate the model, often the training data includes numerous examples so that a robust model is generated to solve a problem for many variations present in the data. In some non-limiting embodiments or aspects, generating the model (e.g., based on training data from a variety of sources) is referred to as "training the model." The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or the like. In some non-limiting embodiments or aspects, the model includes a prediction model that is specific to a particular geographic location, a particular merchant, a particular issuer, a particular acquirer, and/or the like. Additionally or alternatively, the prediction model may be specific to a particular user (e.g., a customer of a health care provider using a cloud hosted call center, a customer using a call mapping system, a medical doctor resource of a health care provider, etc.). In some non-limiting embodiments or aspects, a training server generates one or more prediction models (e.g., one or more route profile models, one or more call segmentations, etc.) for one or more operators of one or more accounts (e.g., one or more customer accounts, one or more health care provider accounts, a health insurance provider account, a medical practice account, etc.), a particular group of customers, and/or the like.

In existing systems, healthcare call centers may not route calls based on an accurate or efficient routing protocol and are often implemented with generic or no routing protocol, are not configured to handle particular types of calls, are prone to bottleneck, are not updated or configured with the right routes, cause patient to doctor communication issues, are a source of frustration to medical staff and professionals, and a major cause of patient dissatisfaction. To handle more calls, a call center will many times add more resources for call handling and transferring of calls in an attempt to aid a call center that is not keeping up with incoming or outgoing calls. For example, in a Miami Cancer Institute (MCI) call center, a monthly call volume was measured at 12,337 calls handled by roughly 30 staff members answering and transferring calls, with 17% of the calls dropped (e.g., hung up, etc.) before a caller was provided an opportunity to speak. For example, based on call data, it was determined that it took the call center of MCI an average of 88 seconds to answer calls. In existing systems, a lack of routing capability, structure, and flexibility can limit a call center from connecting accurately, thereby limiting call functions and execution of call operations. In such existing systems, the use of such a reactive approach, results in adding more phone staff, more hardware, more devices, more hops (e.g., hop count of n means that n network devices separate the source caller from the destination resource, etc.), and/or the like that can add time to a patients call, increase cost, cause increased instability, and provide inaccurate and inefficient call handling resulting in callers having multiple hops and ending up with someone who is ill equipped to handle the call. In many existing systems, to solve problems with inaccurate calls, call centers assign more agents. In MCI, in one example, a total of 88 agents were needed to handle the increase call load, over 58 more agents year over year. Such increases in structure and staffing are also unsustainable.

Non-limiting embodiments or aspects of the disclosed subject matter are directed to systems, methods, and computer program products for: providing a resource interface having one or more interface elements mapping a resource to a call based on current calls and predicted calls; determining a dynamic handling profile from a plurality of dynamic handling profiles that include call information which maps to a resource to provide a ruleset for handling one or more types of call requests; identifying a routing rule comprising one or more routing rules of the ruleset based on caller information; receiving an activation of a resource interface element of the resource interface to initiate a call routing request to forward an assigned call to the resource; and controlling the call routing request according to the routing rule of the dynamic handling profile to perform a call function associated with the assigned call. In this way, a call mapping system is capable of routing a call to a resource more efficiently and cost effective, with increased handling and accuracy. Such a physician-centric call profile, used to configure a call mapping system that is understood and allowed by resources and based on actual routing of calls and, along with the use of planning and tracking of routing protocols, has provided accuracy and efficiency to increase monthly call volume (e.g., doubled the number of callers to 24,015), decreases dropped and inaccurate routings (e.g., limited to 3% of callers hung up before speaking to an agent, a 560% improvement), and allowed increased processing to handle and route calls (e.g., within an average of just 17 seconds), while decreasing the number of agents (e.g., 24 agents as compared to 88 in the same call center). Such improvements ensure callers are connected to a resource, which can address their call immediately and provide a satisfying experience. Such improvements reduce the number of times a caller is transferred, cuts down on the amount of time a caller spends on the phone, and provides routing accuracy, such that callers have their call directed to the best possible resource the first time, so that they can have their needs met. Processing calls quickly has the additional benefits of increasing customer satisfaction, increasing routing efficiency, and reducing the amount of time that call center agents spend with customers, thereby reducing the need for additional staff, computers or other systems. An additional advantage of a physician-centric call profile is an application that can be intuitively planned with, visualized, and quickly changed upon changes to a resource.

For the purpose of illustration, in the following description, while the presently disclosed subject matter is described with respect to methods, systems, and computer program products for accurately routing a call between an agent and a resource, one skilled in the art will recognize that the disclosed subject matter is not limited to the illustrative embodiments. For example, the methods, systems, and computer program products described herein may be used with a wide variety of settings, dynamically assigning an inference request in any suitable setting, based on any suitable parameter, to maximize one or more of speed, throughput, latency, accuracy, rate of learning, energy efficiency, and/or the like.

Referring now to FIG. 1A, FIG. 1A is a diagram of a non-limiting embodiment of an environment for a call mapping system 100 in which systems, products, and/or methods, as described herein, may be implemented. As shown in FIG. 1A, call mapping system 100 includes callers 102, gateway distributor 104, agents 106, resources 108, network 110, call data 112, routing data 114, and interface 116. The gateway distributor 104, upon receiving a call from callers 102, determines an agent where the call can be forwarded. Agents 106 receive calls from callers 102, determine call requests, determine dynamic handling profiles, and transfer calls to resources 108.

Agents 106 may determine additional information about callers 102 through alternative information channels while processing a user interface comprising information received from application services (e.g., call data 112, routing data 114, etc.). For example, call mapping system 100 provides call data for a current state. The call data may include at least one or more of call types, caller types, call recipients, or notes. The call mapping system 100 provides an interface for mapping an organization in hierarchical format. As an example, general call type categories are used to map calls to resources. The general call type categories can include subdomains down to a specific singular call type.

In some non-limiting embodiments or aspects, call types may be classified based on one or more characteristics: urgent, appointments, new patient, existing patient, general questions, hours, directions, records, clinical questions, meds, upcoming patient, escalations, and/or the like.

In some non-limiting embodiments or aspects, caller types may be classified based on one or more characteristics: patient, caretaker/family, internal office, MD to MD, staff to staff, external office, physician practice, 3rd party, lab, lawyer, and/or the like.

In some non-limiting embodiments or aspects, call recipients may be classified based on one or more of characteristics: clinical, MA, APP, RN, MD, lab, tech, clerical, business, office, scheduling, support, patient, experience, leadership, supplemental departments, and/or the like.

An example organization may include one or more of the following categories:

Business office authorizations and billing (i.e., insurance verification, outpatient authorizations, diagnostic authorizations, insurance referrals, infusion authorizations, infusion/chemo, radonc, diagnostic/imaging, lab bills, hospital bills, comprehensive pathology associates bills, radiology); business office financial counseling/payment assistance (i.e., imaging and radiation therapy, medical oncology and breast center, medical oncology and cancer support services, blood and marrow transplant, research, infusion suite and rapid treatment), research/clinical trials, fertility preservation, genetic testing, genomic medicine, express symptom management, retail pharmacy, community events, pastoral care, hospitality, international patients, grievances (patient experience), volunteering, medical records, patient portal and website services, and pain management; or departments including, medical oncology/hematology, benign hematology clinic, biospecimen repository facility, blood and marrow transfusion, infusion, blood and marrow transplant, head and neck, urologic oncology, orthopedic oncology/orthopedic surgical oncology, thoracic, pediatrics, radiation oncology, endocrine surgery, plastic and reconstructive surgery, sarcoma or melanoma surgeon, cancer support, survivorship program, nurse navigators, social work, nutrition, exercise physiology, medical genetics, neuro oncology/neuro surgery, gyne surgical oncology, breast center surgeons, gastro health, gastro health/colorectal surgery, boutique/gift shop, clinical trials, patient experience, diagnostic imaging, express symptom management, fertility preservation, genetics/genomic medicine, international services, palliative medicine, pastoral care, pharmacy, proton therapy, skin clinic, and volunteer services.

With continued reference to FIG. 1A, agents 106 search for call requests in resource profiles based on mapped calls. For example, mapped calls identify a global ruleset, a higher level set of rules (e.g., organizationally, parent/child, domain/subdomain, etc.) to identify a global routing ruleset for how an organization handles calls.

Figure 1B:
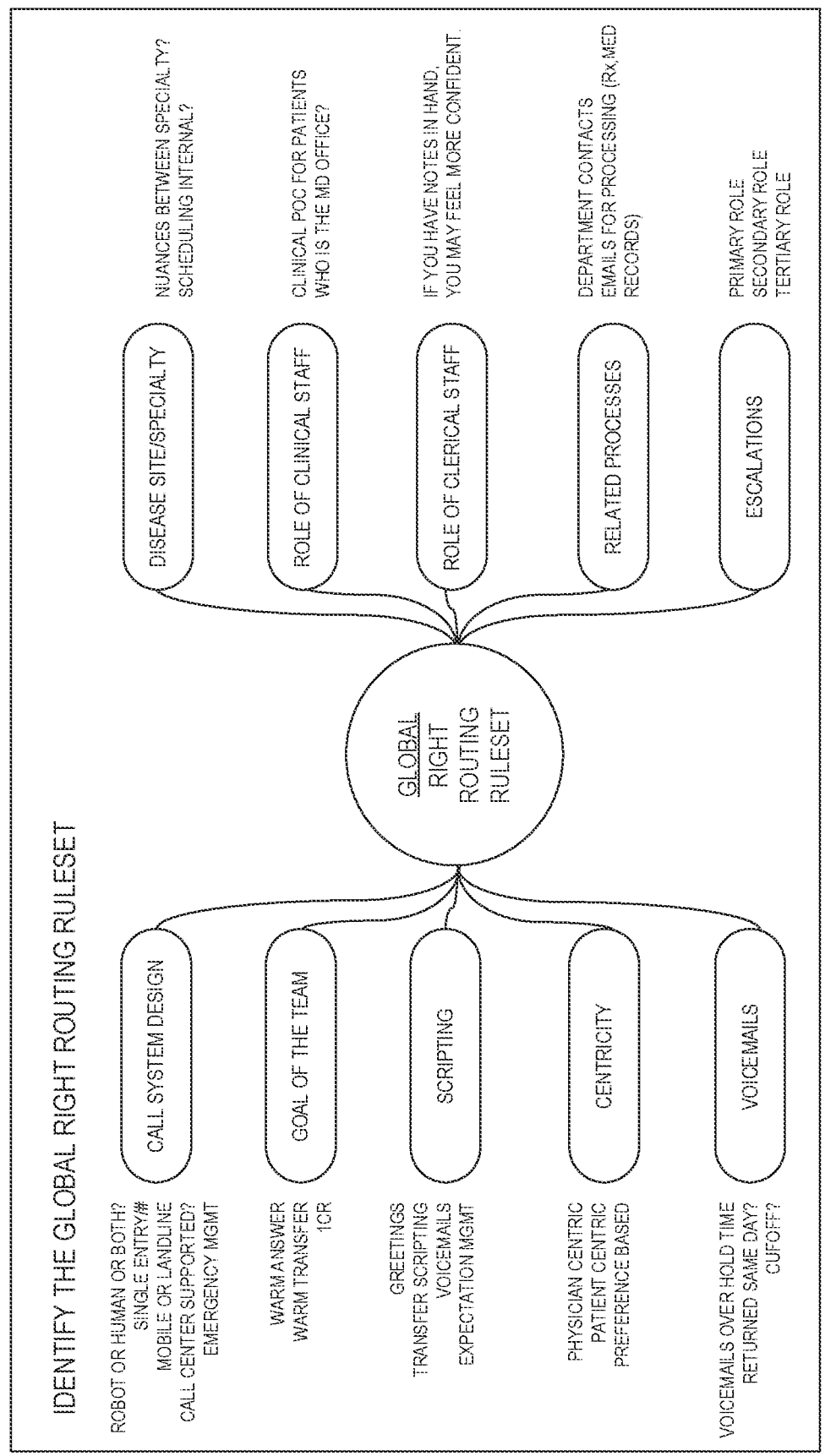

In some non-limiting embodiments or aspects, the global ruleset forms the foundation for building the right dynamic handling profile. With reference to FIG. 1B, a diagram of an exemplary implementation of identifying a global right routing ruleset. The global ruleset provides an authorization of the organizations intent with respect to the rules used in the dynamic handling profiles. The intent is reflected in nonnegotiable rules and concepts and may address each category map and define our desired patient experience.

Agents 106 search for a local ruleset. A dynamic handling profile defines at least one local ruleset, such as a routing protocol for an organizational resource (e.g., a physician, physician team, medical department, etc.), a local adaptation of a global ruleset (e.g., a right dynamic handling profile, route profile, etc.), or md-centric call profile. The dynamic handling profile maps all global rules into local rules, while defining details for agents 106.

Figure 1C:
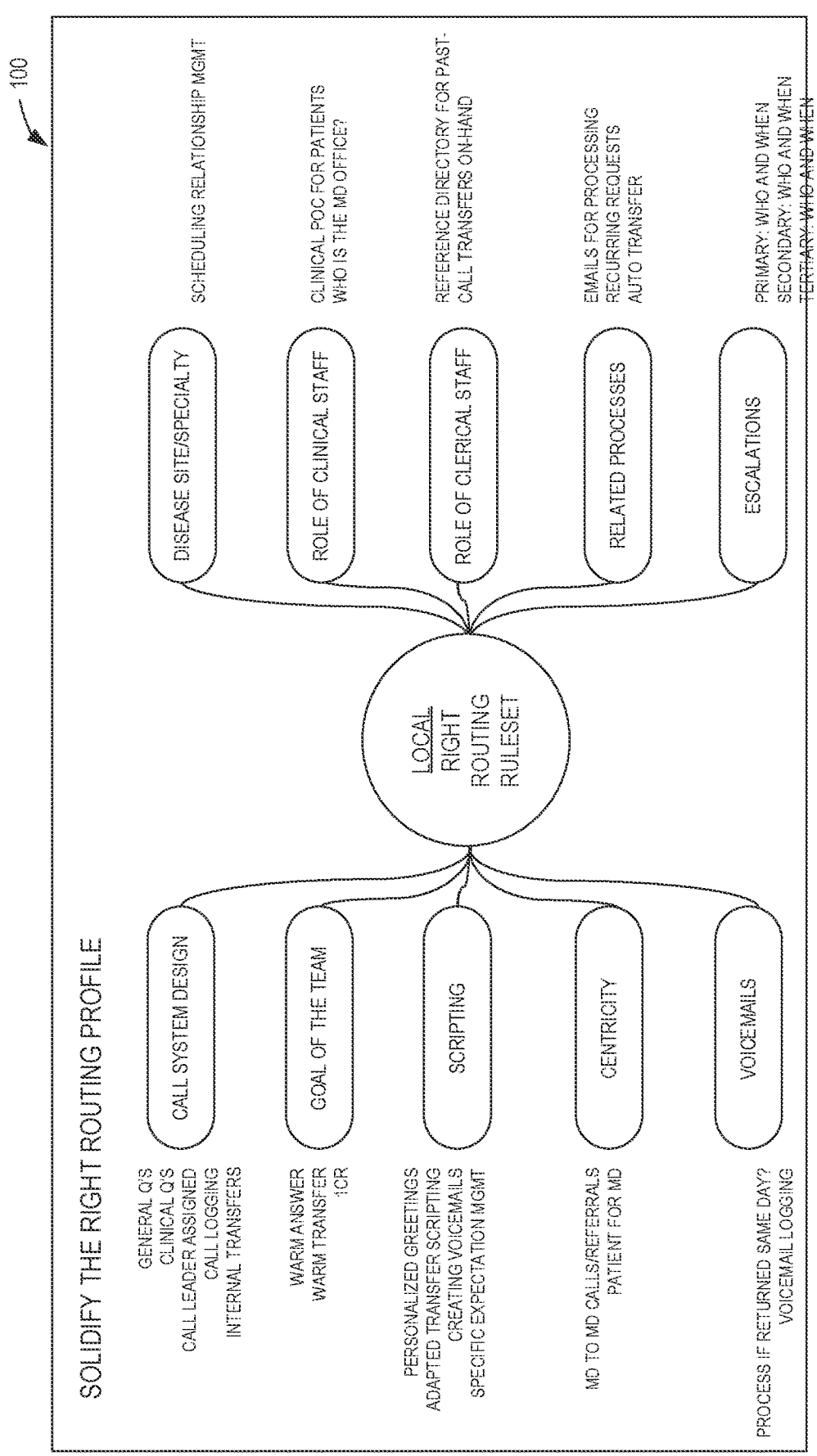

With reference to FIG. 1C, a diagram of an exemplary implementation of solidifying a global right routing ruleset. In some non-limiting embodiments or aspects, interface 116 provides the physician or delegates interface elements to solidify preferences and authorizes personal right dynamic handling profiles (e.g., a resource, etc.). Right dynamic handling profile maps the rules onto actual patient calls in real-time.

With continued reference to FIG. 1A, when an improvement is made, call mapping system uses call improvement feedback to update resource profiles. In some non-limiting embodiments or aspects, call data 112 and routing data 114 determine call improvement feedback. Feedback is received from the call data and provides improvement information. For example, feedback is used to refine a right dynamic handling profile. In some non-limiting embodiments or aspects, call mapping system 100 provides a rule (e.g., a rule of twice, etc.) which mandates inclusion of any unaccounted-for call issues (e.g., question, exception, etc.), or in other examples, issues, or a combination of issues, that occur a predetermined number of times and incorporate rule changes regularly.

Agents 106 may determine a dynamic handling profile or may determine a ruleset. For example, Agents 106 may search a data source for a dynamic handling profile based on a call request, mapping a caller 102 to resource 108. Agents 106 may route a call using a routing rule to resources 108.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a voice service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1A are provided as an example. There may be additional systems, devices, and/or networks; fewer systems, devices, and/or networks; different systems, devices, and/or networks; and/or differently arranged systems, devices, and/or networks than those shown in FIG. 1A. Furthermore, two or more systems or devices shown in FIG. 1A may be implemented within a single system or device, or a single system or device shown in FIG. 1A may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2A:
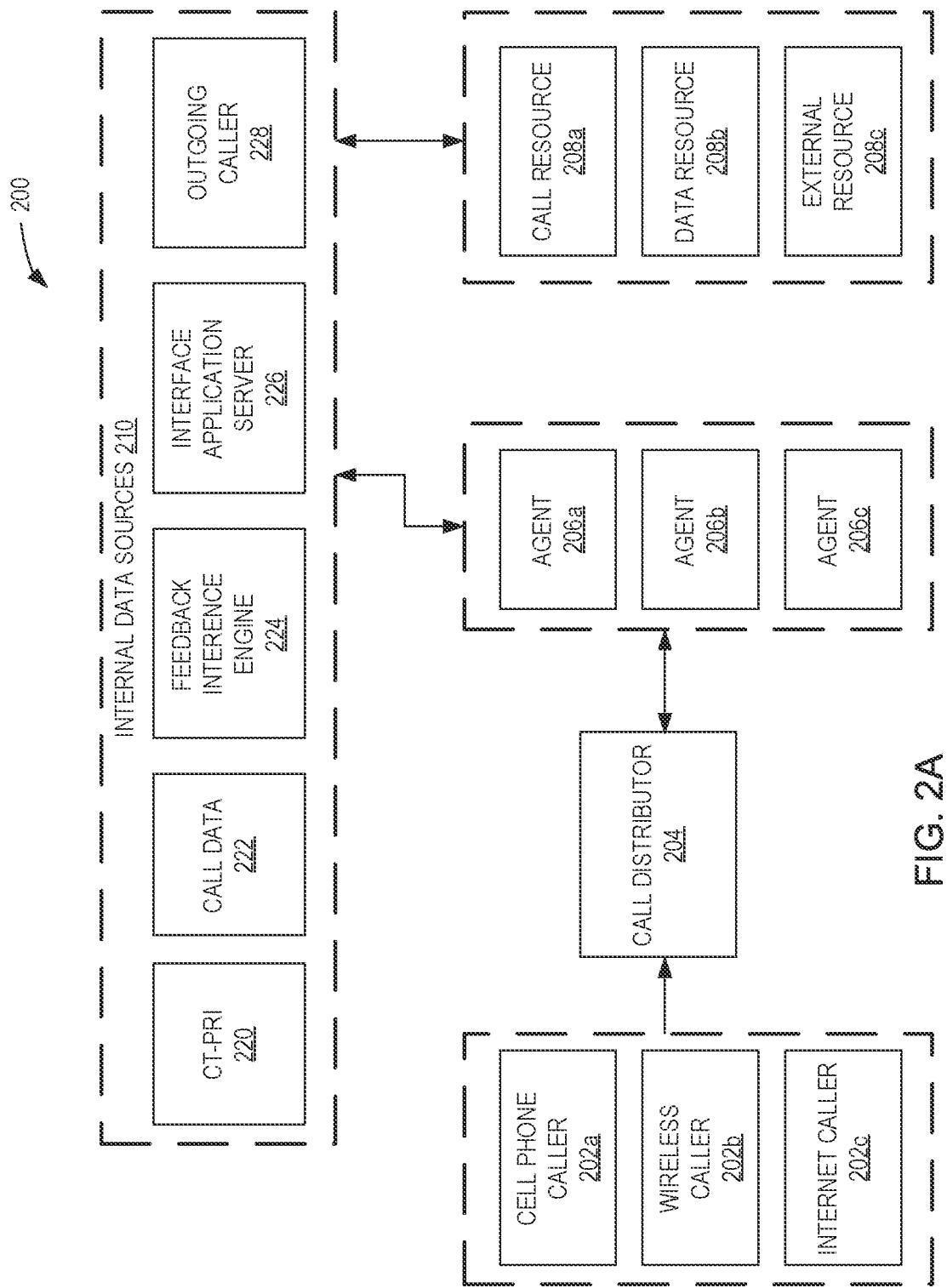
FIGS. 2A-2B are diagrams of non-limiting embodiments of components, devices, and systems, in which methods, systems, protocols, and/or computer program products, described herein, may be implemented according to the principles of the presently disclosed subject matter.

Referring now to FIG. 2A, FIG. 2A is a diagram of a non-limiting embodiment of an environment 200 in which systems, products, and/or methods, as described herein, may be implemented. As shown in FIG. 2A, environment 200 includes telephone caller 202*a*, wireless caller 202*b*, internet caller 202*c* (e.g., corresponding to callers 202), call distributor 204, agent 206*a*, agent 206*b*, agent 206*c* (e.g., corresponding to agents 206), call resource 208*a*, data resource 208*b*, external resource 208*c* (e.g., corresponding to resources 208), internet data sources, CT-PRI 220, call data 222, feedback inference engine 224, interface application server 226, and outgoing caller 228.

As shown in FIG. 2A, feedback inference engine 224 provides applications services, such as a platform for modeling dynamic handling profiles, and may include one or more processors (e.g., one or more of a CPU-Based Inference Engine, a GPU-Based Inference Engine, a TPU-Based Inference Engine, a FPGA-Based Inference Engine, etc.). Upon receiving an inference request from an inference source, feedback inference engine 224 determines a routing data (e.g., routing rulesets, global rulesets, resource profiles, etc.) model for the feedback request based on dynamic system states and feedback data. In some non-limiting embodiments or aspects, after a machine learning model is trained, it is then optimized and deployed.

With continued reference to FIG. 2A, feedback data includes one or more volumes of new data for forming an inference request to a trained model. The volumes of new data may include call records, standard call transaction data, call transaction dates, call transaction times, caller ID, call transaction value, customer-defined reference number, insurance order number, insurance amount, insurance line-item details (e.g., insurance items, etc.), medical data details, hospital data, case data, account balance data and/or like forms of new data. In some non-limiting embodiments or aspects, an inference request refers to the process of taking a model that has already been trained (as above) and using that trained model to make useful predictions, or alternatively, any other characterizations based on or associated with the inference request (e.g., feedback, improvement, etc.).

Figure 2B:
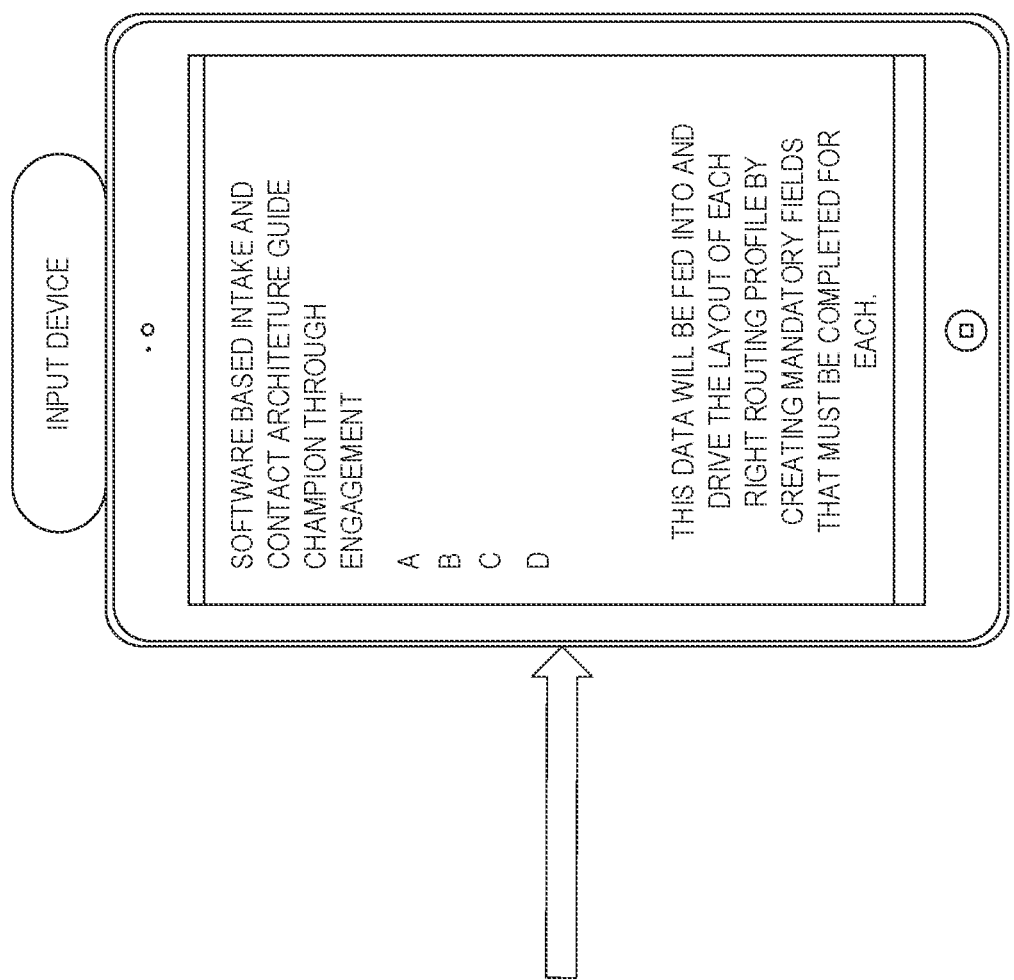

With reference to FIG. 2B, software based intake and contact architecture guide is provided to guide an interaction with a client. In some examples, an interface guides a process of establishing an architecture of the many contacts made between callers and the many call recipients. For example, the data from an interface may load (e.g., feed, populate, etc.) a right dynamic handling profile. The data provides information when used in combination with call mappings to create mandatory fields that must be completed for each.

Figure 3:
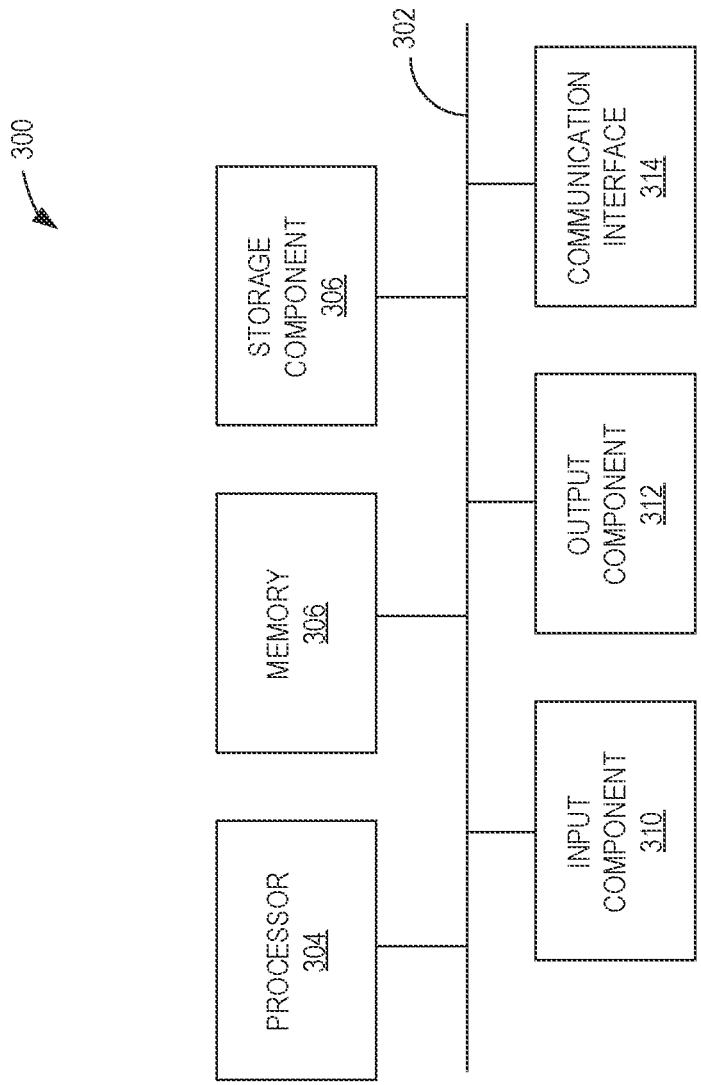
FIG. 3 is a diagram of a non-limiting embodiment of components of one or more devices of FIG. 1 and FIG. 2.

Referring now to FIG. 3, FIG. 3 is a diagram of example components of a device 300. Device 300 may correspond to one or more devices of callers 102, one or more devices of gateway distributor 104, one or more devices of agents 106, one or more devices of resources 108, one or more devices of network 110, one or more devices of internal data sources CT-PRI 220, one or more devices of call data 222, one or more devices of feedback inference engine 224, one or more devices of interface application server 226, and one or more devices of outgoing caller 228 (e.g., outbound voice call server, etc.). In some non-limiting embodiments or aspects, callers 102, gateway distributor 104, agents 106, resources 108, network 110, CT-PRI 220, call data 222, feedback inference engine 224, interface application server 226, and outgoing caller 228 may include at least one device 300 and/or at least one component of device 300. As shown in FIG. 3, device 300 may include bus 302, processor 304, memory 306, storage component 308, input component 310, output component 312, and communication interface 314.

Bus 302 may include a component that permits communication among the components of device 300. In some non-limiting embodiments or aspects, processor 304 may be implemented in hardware, software, or a combination of hardware and software. For example, processor 304 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 306 may include random access memory (RAM), read-only memory (ROM), and/or another type of dynamic or static storage device (e.g., flash memory, magnetic memory, optical memory, and/or the like) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touch screen display, a keyboard, a keypad, a mouse, a button, a switch, a microphone, a camera, and/or the like). Additionally or alternatively, input component 310 may include a sensor for sensing information (e.g., a global positioning system (GPS) component, an accelerometer, a gyroscope, an actuator, and/or the like). Output component 312 may include a component that provides output information from device 300 (e.g., a display, a speaker, one or more light-emitting diodes (LEDs), and/or the like).

Communication interface 314 may include a transceiver-like component (e.g., a transceiver, a receiver and transmitter that are separate, and/or the like) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 3 are provided as an example. In some non-limiting embodiments or aspects, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

Referring now to FIG. 4, FIG. 4 is a step diagram of a non-limiting embodiment of process 400 for dynamically routing a communication request to a patient resource with a single point of contact. In some non-limiting embodiments, one or more of the steps of process 400 are performed (e.g., completely, partially, etc.) by callers 102 (e.g., one or more devices of callers 102), by gateway distributor 104 (e.g., one or more devices of gateway distributor 104), by agents 106 (e.g., one or more devices of agents 106), and by resources 108 (e.g., one or more devices of resources 108). In some non-limiting embodiments, one or more of the steps of process 400 are performed (e.g., completely, partially, etc.) by another device or a group of devices separate from or including callers 102, gateway distributor 104, agents 106, resources 108, network 110, by internal data sources CT-PRI 320, call data 222, feedback inference engine 224, interface application server 226, outgoing caller 228 (e.g., one or more devices of the internal data sources). It is envisioned that any such processing-bound model can be used to route a communication request to a patient resource with a single point of contact.

As shown in FIG. 4, at step 402, process 400 includes receiving an assigned call including caller information associated with the assigned call prior to the telephone call being answered to route the call to a resource. For example, agents 106 receive an assigned call including caller information prior to the telephone call being answered. In some example, gateway distributor 104 is programmed to transfer the call to agents 106. While transferring, caller information may be obtained. The caller information may be sent to agents 106 and used to a route the call to resources 108, or alternatively, agents 106 may determine caller information after receiving an assigned call (e.g., answering, accepting a call in an agent queue, etc.). The assigned calls may be received through one or more interfaces that facilitate input and identification of input (e.g., data sources, etc.).

As shown in FIG. 4, at step 404, process 400 includes providing a resource interface based on current and predicted calls. For example, agents 106 receive a resource interface having one or more interface elements mapping a resource to a call based on current calls and predicted calls. For example, agents 106 communicate with internal data sources 210 to request a dynamic handling profile. Internal data sources 210 are configured to provide interfaces to a dynamic handling profile repository. Agents 106, may search the repository based on the call request, or alternatively, based on the caller information.

In some non-limiting embodiments or aspects, inference application server 226 receives call improvement feedback. The feedback is determined from call request data. For example, the call request data includes data fields that includes inferences that may be combined in unique ways, to be characterized, or associated with the one or more types of call requests that provide an opportunity to train the call mapping system. The call feedback generates one or more updated dynamic handling profiles based on the call improvement feedback.

In some non-limiting embodiments or aspects, the call mapping system provides a notifier interface element of the resource interface when at least one of a new call request outlier, a call issue arises, or a feedback improvement is made. For example, the notifier interface element is provided to identify that a profile change needs to be made as a result of call improvement feedback. As an example, a trained dynamic handling profile model is used to generate dynamic handling profiles including the one or more updated dynamic handling profiles based on call request data. The call improvement feedback includes call information related to a similar organization, further comprising, providing the call information to associated change within their unique environment.

In some non-limiting embodiments or aspects, the call improvement feedback includes a rule of twice identifying all call request outliers that occur more than once that can be used to provide automatic notifications (e.g., call backs, communication through alternate or co-channels of communication, etc.). For example, the call improvement feedback may indicate a number of call requests about the coronavirus. The call handling system 100 determines which callers should receive notifications. Additional feedback may be used to determine a type of notification, such as connecting the call to a specialized MD. In another example, call handler system 100 generates a queue based on a call request (e.g., places an identifier of a call, caller, request, etc.). Callers in the system can automatically receive a letter communicating information (e.g., information about Covid- 19, specialized contextual information, etc.). The communications can be triggered by a call request, such as, for example, every caller asking about a hurricane is placed on a list for a follow up call to make sure the patient is following medical guidelines during the storm.

As shown in FIG. 4, at step 406, process 400 includes determining a dynamic handling profile from a plurality of dynamic handling profiles. For example, agents 106 determine a dynamic handling profile from a plurality of dynamic handling profiles that include call information which maps to the resource to provide a ruleset for handling one or more types of call requests. For example, the call mapping system provides a call mapping system for generating the ruleset for one or more resources by mapping incoming calls for each resource of the one or more resources.

In some non-limiting embodiments or aspects, process 400 includes generating a call map, including at least one of a call type associated with one or more incoming calls, a caller type for one or more incoming calls, call recipient type for one or more incoming calls, or exceptions associated with one or more incoming calls. For example, a call map includes a call map, mapping callers to resources. Such a call map provides automatic call mapping and controlling during a call to handle and map to a resource. In particular, the present invention relates to mapping an entirety of a call landscape, caller types, recipient types, and call results, to learn an organization architecture. This knowledge of the organization provides a base for mapping the calls to the call recipients, as it is possible to know or predict in an organization who is making calls, who is receiving, and the results of the call. In call mapping system 100, knowledge of service lines and information from a caller can make a service more specific to a client's request (e.g., for example messages tailored to a client's past medical queries, etc.).

In some non-limiting embodiments or aspects, a call landscape may comprise a position and resource preference for a ruleset. For example, a particular MD may prefer to have a call transferred instead of voice mail given a set of constraints when a call is requested.

In some non-limiting embodiments or aspects, process 400 includes identifying a global routing ruleset comprising one or more shared routing rules providing handling parameters for each of the one or more resources.

As shown in FIG. 4, at step 408, process 400 includes identifying a routing rule of the ruleset based on caller information. For example, agents 106 identify a routing rule comprising one or more routing rules of the ruleset based on caller information.

As shown in FIG. 4, at step 410, process 400 includes activating a resource interface element to initiate a call routing request based on routing rule. For example, interface 116 receives an activation of a resource interface element of the resource interface to initiate a call routing request to forward the assigned call to the resource based on the routing rule.

In some non-limiting embodiments or aspects, the call mapping system 100 provides the dynamic handling profile allowing a one-hop call request (e.g., only one-hop calls, etc.) between a caller and the resource, wherein the one-hop call request may comprise the at least one agent computer, the telephone agents, a computer application, or packet based phones and, further, wherein telephone functions performed by the telephone agents and the plurality of computers, include answering, holding, and transferring calls.

As shown in FIG. 4, at step 412, process 400 includes controlling a call routing request according to the routing rule of the dynamic handling profile to perform a call function associated with the assigned call. For example, agents 106 control a call routing request of the call mapping system according to the routing rule (e.g., right routing rule, local rule, etc.) of the dynamic handling profile to perform a call function associated with the assigned call.

In some non-limiting embodiments or aspects, interface 116 receives an activation of a resource interface element of the resource interface. For example, interface 116 may be an application interface (e.g., user interface, mobile interface, web interface, application program interface, etc.) that can be used to initiate a call routing request to forward the assigned call to the resource.

Figure 5A:
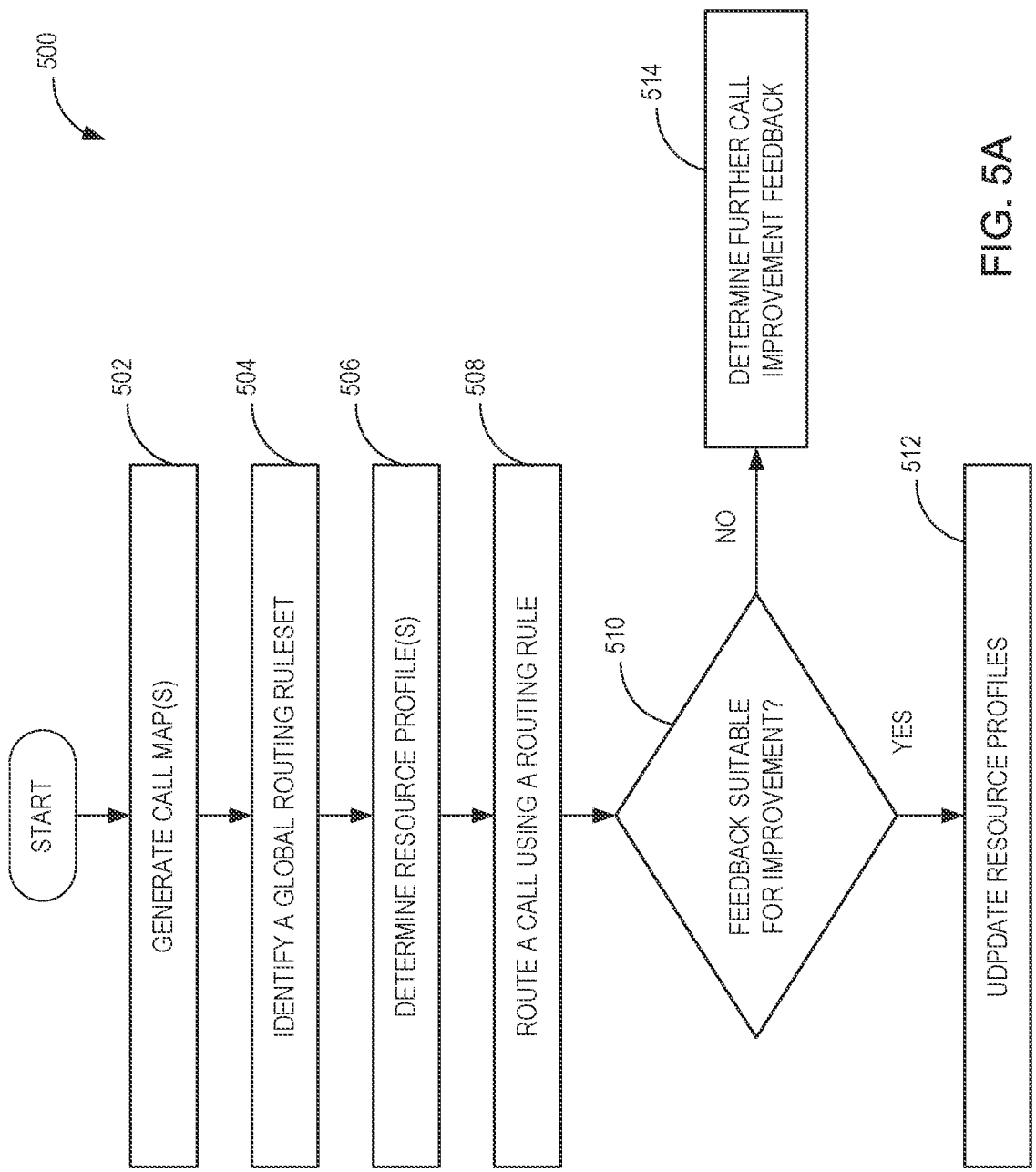

Referring now to FIG. 5, FIG. 5 is a step diagram of a non-limiting embodiment of a process 500 for dynamically routing a communication request to a patient resource with a single point of contact. In some non-limiting embodiments, one or more of the steps of process 500 are performed (e.g., completely, partially, etc.) by call mapping system 100 including callers 102 (e.g., one or more devices of callers 102), by gateway distributor 104 (e.g., one or more devices of gateway distributor 104), by agents 106 (e.g., one or more devices of agents 106), and by resources 108 (e.g., one or more devices of resources 108). In some non-limiting embodiments, one or more of the steps of process 400 are performed (e.g., completely, partially, etc.), by another device or a group of devices separate from or including callers 102, gateway distributor 104, agents 106, resources 108, or network 110, or by the internal data sources CT-PRI 320, call data 222, feedback inference engine 224, interface application server 226, and outgoing caller 228 (e.g., one or more devices of the internal data sources). It is envisioned that any such processing-bound model can be used to route a communication request to a patient resource with a single point of contact.

In some non-limiting embodiments or aspects, call mapping system 100 includes a call planning and execution software interface (e.g., one or more interfaces, one or more interface elements, etc.), for integrating primary healthcare-centric computing tools through the use of a bi-directional algorithm. The call mapping system may categorize current and/or future calls of an entity (e.g., an organization, a healthcare provider, etc.), identify a global call routing ruleset, formulate detailed call routing protocol, and evolve the call-routing protocol based on internal and external call request feedback. The steps of process 500 provide decision based data for generating data in the next step. At step 502, call maps are generated. For example, call maps are generated in a classification model used to provide a mapping of all potential organizational calls. For example, call mapping system 100 classifies calls based on call type, caller type, and call recipient.

With continued reference to FIG. 5, at step 504, call mapping system 100 identifies a global routing ruleset. For example, a global call identity interface (e.g., model, questionnaire, survey, etc.) provides interface elements to identify the global (e.g., organization, etc.) call handling parameters and rulesets to be followed. In some non-limiting embodiments or aspects, global parameters and rulesets are followed at all lower levels regardless of other preferences. The global call identity interface includes a call system design, performance metrics, scripting, centricity (client or provider), voicemail configuration, subordinate nuances, role of professional staff, role of clerical staff, and escalation methodology.

At step 506, call mapping system 100 determines resource profiles. For example, during step 506, the global routing ruleset is used to generate resource profiles. For example, a resource is generated based on the global routing ruleset to include resource rules within the global parameters and rulesets, such as rules for satisfying at least one of a performance metric, a specified script, a centricity (client or provider), a voicemail, a role of the professional staff, a role of the clerical staff, or an escalation rule.

At step 508, call mapping system 100 routes a call using a routing rule. In some non-limiting embodiments or aspects, right dynamic handling profiles translate structured contact information into a request-based logical sequence. In such an example, right dynamic handling profiles are stored in a searchable repository (e.g., database management system, etc.). A unique right dynamic handling profile is created for every major resource (e.g., physician, department, etc.) and incorporates the call fields/categories from the "categorize map", as well as, the global ruleset identified within the "global call identity" questionnaire. An agent is provided with a dynamic handling profile to facilitate connecting a caller to a correct recipient. For example, an agent provides a search criteria based on a patient's call request to determine a dynamic handling profile from a searchable repository.

At step 510, call mapping system 100 determines if feedback is suitable for improvement. For example, a call feedback captures call issues and unaccounted-for requests. The call feedback provides information to update (e.g., evolve, change, improve, etc.) the right dynamic handling profile. Call mapping system 100 accounts for all possible caller requests. The call feedback may include a duplicate search logic known as the rule of twice, which identifies all outliers that occur more than once or, in other examples, a model is trained to determine call issues in a dataset comprising call data for an organization. A profile change is generated as a result. In some non-limiting embodiments or aspects, call mapping system 100 provides a notification when a new call request or call issue is identified. A new call request or call issue may be identified by input of an agent or other user during a call request.

At step 512, call mapping system 100 updates resource profiles. In some non-limiting embodiments or aspects, call mapping system 100 provides a searching algorithm to automatically identify new call requests and call issues from a searchable data source, such as, call data stored in a database management system. In some non-limiting embodiments or aspects, new call requests or call issues may provide information for configuring a dynamic handling profile within an organization, within a similar organization, within an organization having common roles and/or the like. The call mapping system 100 allows the user to incorporate an associated change within a unique environment.

At step 514, call mapping system 100 determines further call improvement feedback and automatically updates a resource profile based on the call feedback. As shown in FIG. 5B, in some non-limiting embodiments or aspects, call feedback provides information to evolve the right dynamic handling profile. A profile change is generated as a result. After the change is made, an updated ruleset is available.

Figure 6A:
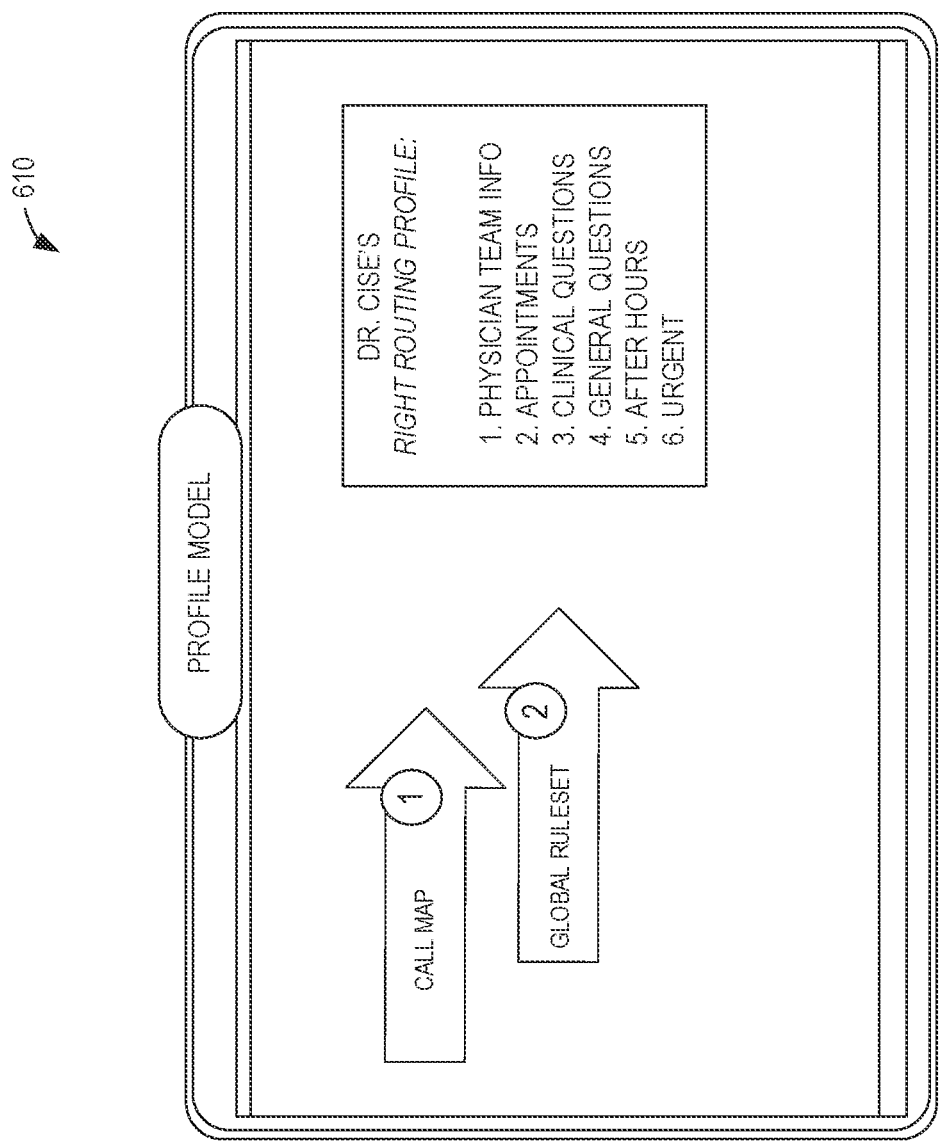
FIG. 6A-6C are illustrations of routing ruleset interfaces according to non-limiting embodiments or aspects of the present invention.
Figure 6B:
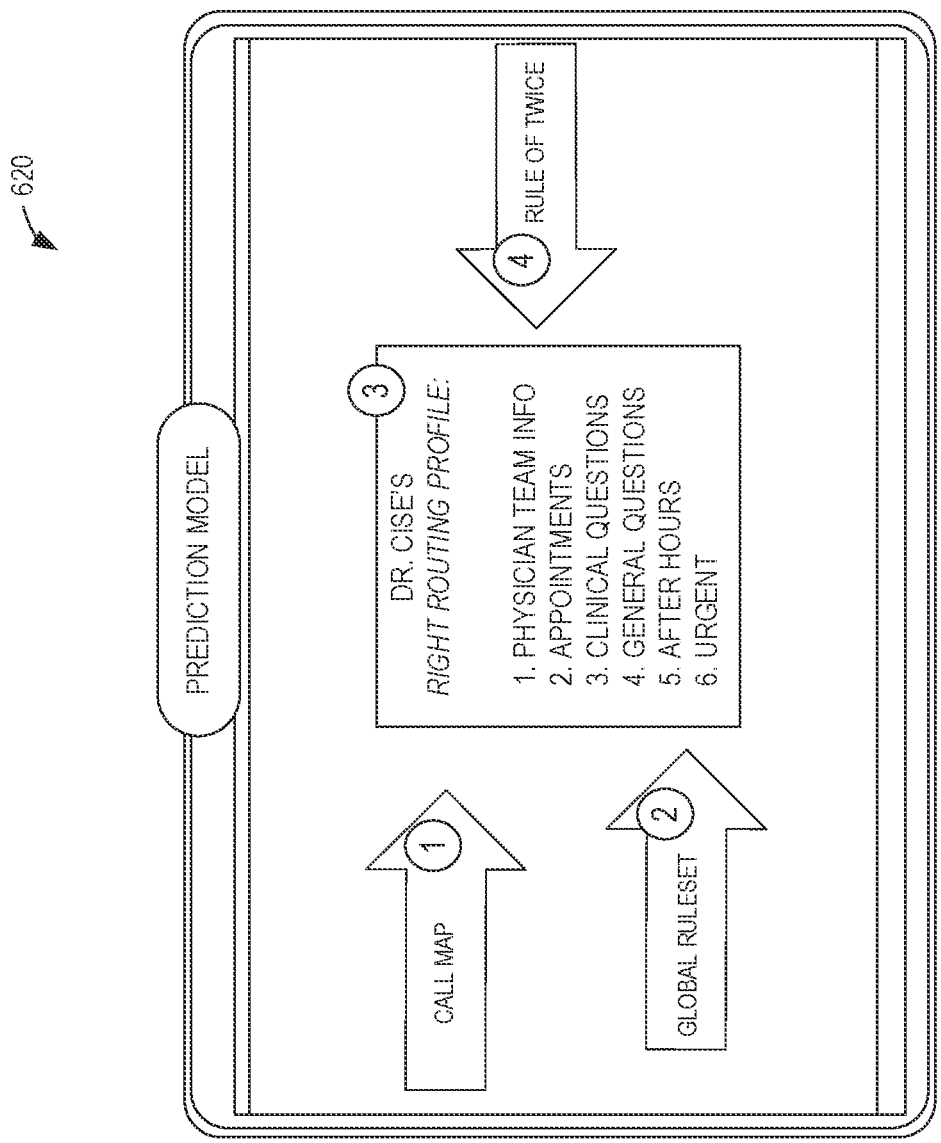
Figure 6C:
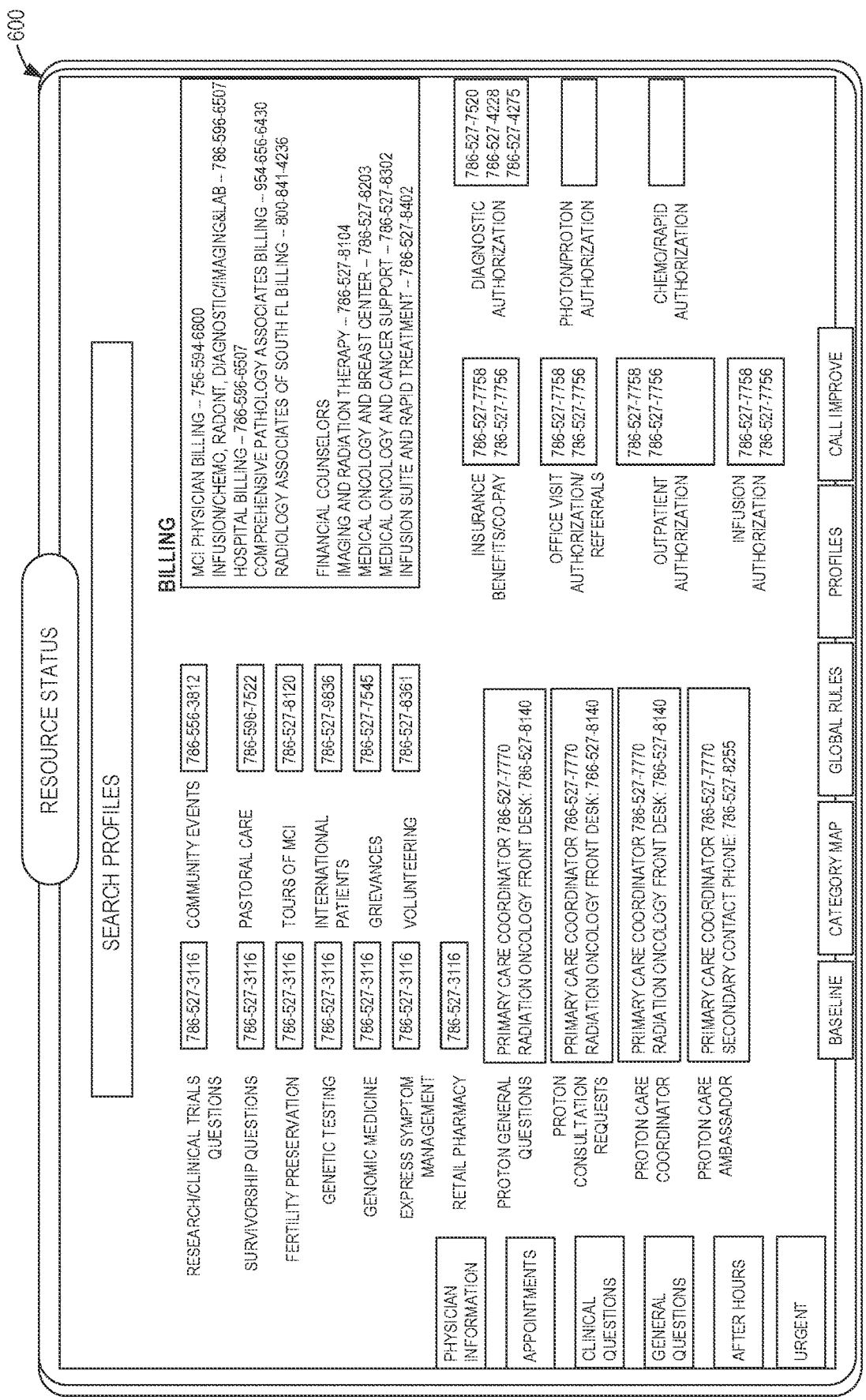

FIGS. 6A-6C illustrate example routing ruleset interfaces according to non-limiting embodiments or aspects of the present invention.

With reference to FIG. 6C, an example of a resource profile of the call handler system 100. The resource profile is provided in an application (e.g., web application, mobile app, etc.). The application provides a search bar. For example, a user interface provides a search capability to find profiles, display a resource profile with a resource status. In some cases, the resource status window is automatically populated based on caller information that is prepopulated. For example, a call request may associate with a particular resource based on information informing the agent that they were looking to talk to a clinical trials department, when that is prepopulated to the agent (e.g., a voice recognition, phone selection menu, etc.) within the call center it enhances the service by shortening the length of time a caller is waiting to connect to a doctor or some other profiled recipient.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
    providing a handling interface in a call mapping system having a plurality of communication connected networks, the call mapping system including:
        a call distributor for assigning a plurality of incoming calls to telephone agents;
        a computer telephone-mapping profiler integration (CT-MPI) system for providing mapping profile data for applications to be performed at one or more agent computers of the telephone agents; and
        at least one agent computer of the one or more agent computers for receiving an assigned call including caller information prior to a call being answered to route the call to a resource and provide a resource interface having one or more interface elements mapping a resource to a call based on current calls and predicted calls;
    determining call improvement feedback from call request data for refining an associated dynamic handling profile of the call mapping system;
    generating one or more updated dynamic handling profiles based on call improvement feedback from call information of a similar organization, the call improvement feedback identifying at least one call request outlier associated with the dynamic handling profile that occurs more than once; and
    identifying a profile change to be made as a result of call improvement feedback, with a notifier interface element configured to generate dynamic handling profiles including the one or more updated dynamic handling profiles based on call request data,
    wherein one or more interfaces are provided for integrating primary healthcare-centric computing tools through bi-directional categorization of current or future calls of a healthcare provider to improve the call routing protocol based on internal and external call request feedback of the call improvement feedback.

2. The computer-implemented method of claim 1, wherein the updated dynamic handling profiles are configured to allow a one-hop call request between a caller and the resource such that a plurality of telephone functions are performed by the at least one agent computer are based on the call improvement feedback.

3. The computer-implemented method of claim 2, wherein the call mapping system provides a notifier interface element of the resource interface based on determining at least one improvement from the call improvement feedback.

4. The computer-implemented method of claim 3, wherein the notifier interface element is provided to identify a profile change to be made as a result of call improvement feedback.

5. The computer-implemented method of claim 4, wherein a rule generated from the call improvement feedback includes any unaccounted for call issues.

6. The computer-implemented method of claim 1, further comprising:
providing a feedback inference engine for modeling dynamic handling profiles; and
in response to receiving an inference request from an inference source, determining a routing data model for a feedback request based on dynamic system states and feedback data.

7. The computer-implemented method of claim 1, wherein the call improvement feedback is determined from call request data defined as an inference, wherein the call request data is combined, characterized, or associated with a type of call request before providing the call improvement feedback.

8. The computer-implemented method of claim 1, comprising:
evolving each dynamic handling profile of each possible caller request; and
generating a profile change based on the call improvement feedback.

9. The computer-implemented method of claim 1, comprising:
automatically updating a resource profile based on the call improvement feedback.

10. A call mapping system, comprising:
one or more processors configured to:
provide a handling interface in a call mapping system having a plurality of communication connected networks;
determine call improvement feedback from call request data for refining an associated dynamic handling profile of the call mapping system;
generate one or more updated dynamic handling profiles based on call improvement feedback from call information of a similar organization, the call improvement feedback identifying at least one call request outlier associated with the dynamic handling profile that occurs more than once and
identify a profile change to be made as a result of call improvement feedback, with a notifier interface element configured to generate dynamic handling profiles including the one or more updated dynamic handling profiles based on call request data,
wherein one or more interfaces are provided for integrating primary healthcare-centric computing tools through bi-directional categorization of current or future calls of a healthcare provider to improve the call routing protocol based on internal and external call request feedback of the call improvement feedback.

11. The call mapping system of claim 10, wherein the updated dynamic handling profiles are configured to allow a one-hop call request between a caller and a resource such that a plurality of telephone functions are performed by at least one agent computer are based on the call improvement feedback.

12. The call mapping system of claim 11, wherein the call mapping system provides a notifier interface element of a resource interface based on determining at least one improvement from the call improvement feedback.

13. The call mapping system of claim 12, wherein the notifier interface element is provided to identify a profile change to be made as a result of call improvement feedback.

14. The call mapping system of claim 13, wherein a rule generated from the call improvement feedback includes any unaccounted for call issues.

15. The call mapping system of claim 10, further comprising:
providing a feedback inference engine for modeling dynamic handling profiles; and
in response to receiving an inference request from an inference source, determining a routing data model for a feedback request based on dynamic system states and feedback data.

16. The call mapping system of claim 10, wherein the call improvement feedback is determined from call request data defined as an inference, wherein the call request data is combined, characterized, or associated with a type of call request to provide the call improvement feedback.

17. A computer program product comprising at least one non-transitory computer-readable medium including one or more instructions that, when executed by at least one processor, cause at least one processor to:
provide a handling interface in a call mapping system having a plurality of communication connected networks;
determine call improvement feedback from call request data for refining an associated dynamic handling profile of the call mapping system;
generate one or more updated dynamic handling profiles based on call improvement feedback from call information of a similar organization, the call improvement feedback identifying at least one call request outlier associated with the dynamic handling profile that occurs more than once; and
identify a profile change to be made as a result of call improvement feedback, with a notifier interface element configured to generate dynamic handling profiles including the one or more updated dynamic handling profiles based on call request data,
wherein one or more interfaces are provided for integrating primary healthcare-centric computing tools through bi-directional categorization of current or future calls of a healthcare provider to improve the call routing protocol based on internal and external call request feedback of the call improvement feedback.

* * * * *